US007693889B1

(12) United States Patent
Armorer et al.

(10) Patent No.: US 7,693,889 B1
(45) Date of Patent: Apr. 6, 2010

(54) AUTOMATED BACKUP AND RECOVERY FOR CONTENT REPOSITORY

(75) Inventors: Peter Armorer, Mississauga (CA); Anselmo Barrero, San Jose, CA (US); Brian Gardner, San Jose, CA (US); Roger W. Kilday, Livermore, CA (US); Ken Owens, Burlington (CA); Yasemin Ugur Ozekinci, Burlington (CA); Suavek Zajac, Oakville (CA)

(73) Assignee: EMC Corporation, Hopkinton, MA (US)

( * ) Notice: Subject to any disclaimer, the term of this patent is extended or adjusted under 35 U.S.C. 154(b) by 143 days.

(21) Appl. No.: 11/321,066

(22) Filed: Dec. 28, 2005

(51) Int. Cl.
*G06F 17/00* (2006.01)

(52) U.S. Cl. .................. 707/653; 707/674; 707/690

(58) Field of Classification Search .......... 707/101, 707/102, 200, 204, 104.1
See application file for complete search history.

(56) References Cited

U.S. PATENT DOCUMENTS

| | | | |
|---|---|---|---|
| 4,442,321 A | 4/1984 | Stehman | |
| 4,453,217 A | 6/1984 | Boivie | |
| 5,276,872 A | 1/1994 | Lomet et al. | |
| 5,499,371 A | 3/1996 | Henninger et al. | |
| 5,694,598 A | 12/1997 | Durand et al. | |
| 5,721,918 A * | 2/1998 | Nilsson et al. | 707/202 |
| 5,774,692 A | 6/1998 | Boyer et al. | |
| 5,778,378 A | 7/1998 | Rubin | |
| 5,787,413 A | 7/1998 | Kauffman et al. | |
| 5,829,006 A | 10/1998 | Parvathaneny et al. | |
| 5,832,522 A | 11/1998 | Blickenstaff et al. | |
| 5,850,554 A | 12/1998 | Carver | |
| 5,909,540 A | 6/1999 | Carter et al. | |
| 5,960,437 A | 9/1999 | Krawchuk et al. | |
| 6,047,281 A | 4/2000 | Wilson et al. | |
| 6,085,198 A | 7/2000 | Skinner et al. | |
| 6,292,795 B1 | 9/2001 | Peters et al. | |
| 6,292,905 B1 | 9/2001 | Wallach et al. | |
| 6,317,748 B1 | 11/2001 | Menzies et al. | |
| 6,374,265 B1 | 4/2002 | Chen et al. | |
| 6,374,266 B1 | 4/2002 | Shnelvar | |
| 6,389,460 B1 | 5/2002 | Stewart et al. | |
| 6,405,209 B2 | 6/2002 | Obendorf | |
| 6,496,944 B1 | 12/2002 | Hsiao et al. | |
| 6,546,404 B1 | 4/2003 | Davis et al. | |
| 6,549,992 B1 | 4/2003 | Armangau et al. | |

(Continued)

OTHER PUBLICATIONS

Chervenak et al., Protecting File Systems: A Survey of Backup Techniques, Proceedings Joint NASA and IEEE Mass Storage Conference, 1998, pp. 17-3.

(Continued)

*Primary Examiner*—Charles Rones
*Assistant Examiner*—Rezwanul Mahmood
(74) *Attorney, Agent, or Firm*—Van Pelt, Yi & James LLP (57) ABSTRACT

Performing a backup is disclosed. A first set of data associated with a second set of data is backed up. The first set of data is made available for use before backing up the second set of data. The second set of data is backed up within a prescribed interval after completing the backup of the first set of data. One of the first set of data and the second set data comprises metadata associated with the other of the first set of data and the second set of data and the other comprises one or more items of managed content.

22 Claims, 8 Drawing Sheets

U.S. PATENT DOCUMENTS

| | | | |
|---|---|---|---|
| 6,587,923 | B1 | 7/2003 | Benveniste et al. |
| 6,675,214 | B2 | 1/2004 | Stewart et al. |
| 6,684,219 | B1 | 1/2004 | Shaw et al. |
| 6,704,747 | B1 | 3/2004 | Fong |
| 6,772,365 | B1 * | 8/2004 | Obara ................. 711/112 |
| 6,804,680 | B2 | 10/2004 | Melli |
| 6,842,825 | B2 * | 1/2005 | Geiner et al. ........... 707/201 |
| 6,889,227 | B1 | 5/2005 | Hamilton |
| 7,043,472 | B2 | 5/2006 | Aridor et al. |
| 7,092,955 | B2 | 8/2006 | Mah et al. |
| 7,200,617 | B2 | 4/2007 | Kibuse |
| 7,222,168 | B2 | 5/2007 | Kitamura et al. |
| 7,275,087 | B2 | 9/2007 | Vaschillo et al. |
| 7,310,654 | B2 * | 12/2007 | McNeil .................. 707/204 |
| 7,349,942 | B1 | 3/2008 | O'Connell et al. |
| 7,389,313 | B1 * | 6/2008 | Hsieh et al. ............. 707/204 |
| 7,469,306 | B2 * | 12/2008 | Ng ........................ 707/101 |
| 2001/0056426 | A1 | 12/2001 | Obendorf |
| 2002/0126823 | A1 | 9/2002 | Kumar et al. |
| 2002/0169818 | A1 | 11/2002 | Stewart et al. |
| 2003/0037039 | A1 | 2/2003 | Mah et al. |
| 2003/0040939 | A1 | 2/2003 | Tritch et al. |
| 2003/0078945 | A1 | 4/2003 | Kibuse |
| 2003/0110188 | A1 | 6/2003 | Howard et al. |
| 2003/0163495 | A1 * | 8/2003 | Lanzatella et al. ......... 707/204 |
| 2003/0212789 | A1 * | 11/2003 | Hamel et al. ............. 707/10 |
| 2004/0030837 | A1 * | 2/2004 | Geiner et al. ............. 711/133 |
| 2004/0030852 | A1 | 2/2004 | Coombs et al. |
| 2004/0068575 | A1 | 4/2004 | Cruise |
| 2004/0148477 | A1 * | 7/2004 | Cochran ................. 711/162 |
| 2004/0186881 | A1 * | 9/2004 | Porter et al. ............. 707/1 |
| 2004/0215600 | A1 | 10/2004 | Aridor et al. |
| 2004/0267838 | A1 | 12/2004 | Curran et al. |
| 2005/0050287 | A1 * | 3/2005 | Boyd et al. .............. 711/162 |
| 2005/0060408 | A1 | 3/2005 | McIntyre et al. |
| 2005/0066095 | A1 * | 3/2005 | Mullick et al. ............ 710/200 |
| 2005/0091223 | A1 | 4/2005 | Shaw et al. |
| 2005/0138091 | A1 | 6/2005 | Bono |
| 2005/0160118 | A1 * | 7/2005 | Berkowitz et al. ......... 707/204 |
| 2005/0165868 | A1 | 7/2005 | Prakash |
| 2005/0216788 | A1 | 9/2005 | Mani-Meitav et al. |
| 2005/0246311 | A1 * | 11/2005 | Whelan et al. ............ 707/1 |
| 2005/0256894 | A1 | 11/2005 | Talanis et al. |
| 2006/0004890 | A1 | 1/2006 | Semple et al. |
| 2006/0010173 | A1 | 1/2006 | Kilday et al. |
| 2006/0149889 | A1 | 7/2006 | Sikha |
| 2006/0165868 | A1 | 7/2006 | Takaya et al. |
| 2006/0190478 | A1 | 8/2006 | Owens et al. |
| 2006/0206507 | A1 | 9/2006 | Dahbour |
| 2006/0224361 | A1 | 10/2006 | McIntyre et al. |
| 2006/0235847 | A1 | 10/2006 | Farlee et al. |
| 2007/0028063 | A1 | 2/2007 | Hars et al. |
| 2007/0094269 | A1 | 4/2007 | Mikesell et al. |
| 2007/0156772 | A1 * | 7/2007 | Lechner ................. 707/200 |
| 2007/0288534 | A1 | 12/2007 | Zak et al. |

OTHER PUBLICATIONS

Srinivasan et al., Novel Parallel Join Algorithms for Grid Filed, High Performance Computing, 1996, Proceedings, 3rd International Conference, pp. 144-149.

* cited by examiner

AUTOMATED BACKUP AND RECOVERY FOR CONTENT REPOSITORY

BACKGROUND OF THE INVENTION

Some storage systems include multiple storage components that are required to be in a consistent state for proper operation of the storage system and/or an associated system, application, or process. For example, a managed content repository typically includes a content storage area in which user and/or application data, such as files, are stored and a database storage area containing metadata associated with user and/or application content in the content storage area. Traditionally, creating a consistent backup of related multiple storage areas required holding the multiple storage areas in a consistent state during a backup process, e.g., by preventing the data stored in the respective areas from being accessed, modified, deleted, added to, or otherwise used during at least a substantial portion of the backup process. Such an approach has been used, e.g., to prevent a situation in which data in a first storage area was no longer in a consistent state with corresponding data in a second storage area as backed up by the time the first storage area was backed up, e.g., because data was added, modified, or deleted in the period between the completion of the backup of one area and the backing up of the other. Since in the typical approach the multiple storage areas are rendered inaccessible while the backup is performed, users of the multiple storage areas incur inconvenience and loss of productivity. Therefore, there exists a need for a way to efficiently backup related multiple storage areas in a consistent state

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Consistent backup of components of a managed content repository is disclosed. In some embodiments, loss of availability of content management functionality is minimized by limiting update access to at least one component and associated functionality, e.g., metadata used to manage underlying content data comprising a body of managed content, only to the extent and for as long as required to back up data associated with the at least one component in an internally consistent and/or settled state, with the at least one component coming back on line before a backup of one or more other components has been performed and/or completed.

Figure 1:
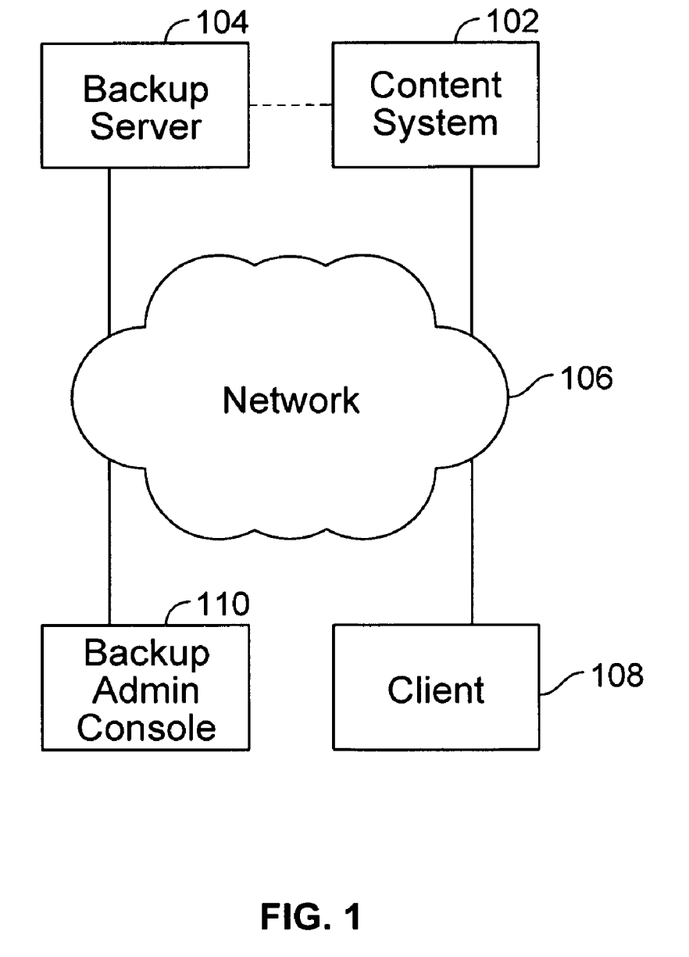
FIG. 1 is a block diagram illustrating an embodiment of a backup environment.

FIG. 1 is a block diagram illustrating an embodiment of a backup environment. Content system 102, backup server 104, client 108, and backup administrator console 110 are connected together through network 106. Network 106 comprises a public or private network and/or combination thereof, for example an Ethernet, serial/parallel bus, intranet, Internet, NAS, SAN, LAN, WAN, and other forms of connecting multiple systems and/or groups of systems together. Client 108 accesses data associated with content system 102. For example, client 108 reads, saves, modifies, and/or searches data stored in a storage area associated with content system 102. Content system 102 is associated with data to be backed up using backup server 104. In some cases, client 108 desires to access the data to be backed up while a backup of the data in content system 102 is being performed. The data associated with content system 102 is stored one or more storage areas of content system 102 and/or on a remote storage area associated with content system 102. In some embodiments, the data to be backed up includes managed content that must be backed up in a consistent manner with metadata associated with the managed content. Backup server 104 backups at least a portion of data associated with content system 102. Data to be backed up from content system 102 is received by backup server through network 106 and/or another data communication path between backup server 104 and content system 102. For example, a SAN (storage area network) between backup server 104 and content system 102 is used. Backup admin console 110 is used configure backup server 104. In some embodiments, backup admin console 110 and client 108 exist together in a single system. In some embodiments, backup server 104 and content system 102 exist together in a system. Any number of backup servers, contents systems, backup admin consoles, and clients may exist.

Figure 2:
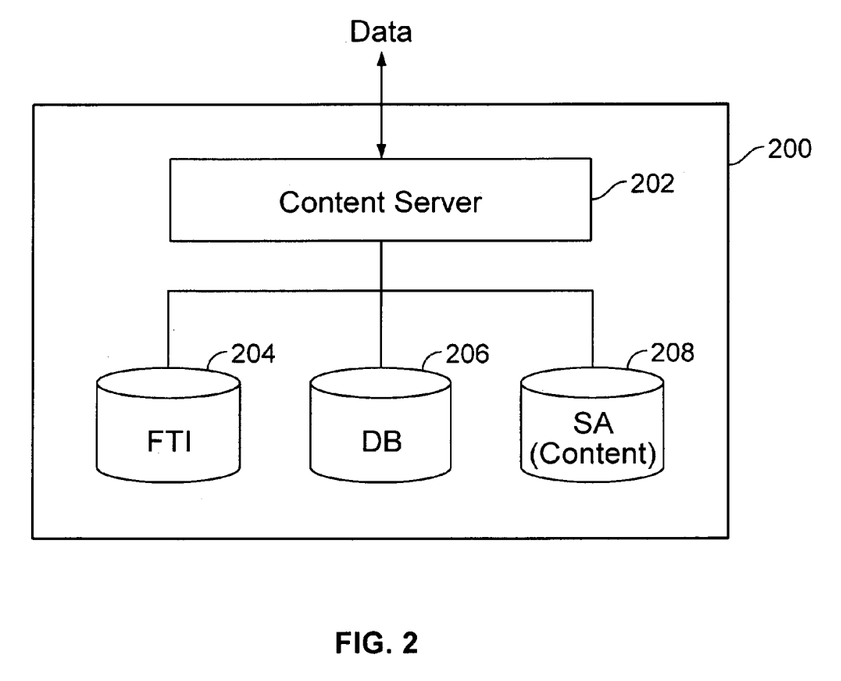
FIG. 2 is a block diagram illustrating an embodiment of a content system.

FIG. 2 is a block diagram illustrating an embodiment of a content system. In some embodiments, content system 200 is included in content system 102 of FIG. 1. Content system 200 includes content server 202, FTI (Full Text Index) 204, DB (Database) 206, and SA (Storage Area content) 208. Content server 202 manages/controls access, configuration, and data contained in FTI 204, DB 206 and SA 208. Content server 202 may manage other storage in content system 200 or a remote storage not contained in content system 200. SA 208 includes one or more data files stored in a file system. For example, content files (e.g, word processing documents) created by a user are stored in SA 208. In some embodiments, SA 208 comprises multiple physical storage area that are logically combined together. In various embodiments, data versioning information is stored in SA 208. For example, when a new version of an old file is stored, the new version is saved as a new file rather than replacing the old version. DB 206 includes metadata associated with data stored in SA 208. The metadata includes one or more of the following: document version information, document owner information, and folder and directory information. In the example shown, information associated with DB 206 is at least in part stored in a database format. A database entry includes metadata information and an identifier associated with corresponding data in SA 206. In some embodiments, metadata associated with data in SA 208 is at least in part stored in a format other than a database. For example, an index data and/or a log data is used. FTI 204 includes an index of at least a portion of data contained in SA 208. FTI 204 can be used to locate data in SA 208 through a search query. For example, a search engine uses index data of FTI 204 to locate desired data in SA 208. In some embodiments, data in SA 208 is indexed to create/update search data associated with FTI 204. In some embodiments, FTI 204 is not implemented in content system 200. In various embodiments, content system 200 includes other logical and/or physical storage components. For example, install and configuration data is associated with content system 200. In some embodiments, at least a portion of FTI 204, DB 206, and/or SA 208 is stored together in a single physical file system. In some embodiments, FTI 204, DB 206, and/or SA 208 is stored across more than one physical storage.

Traditionally, backing up content system 200 requires placing content system 200 offline in order to guarantee content system 200 is in a consistent state for backup. For example, if backup of content server 202 was performed without any guarantee of consistency, a backup of DB 206 can include a reference to a data that a related backup of SA 208 does not contain because the reference was created in between the backup of the SA 208 and the backup of DB 206. While content system 200 is offline, users are unable to access content system 200 until the backup is complete and content system 200 placed back online. When traditionally performing the backup, FTI 204, DB 206, and SA 208 are manually backed up individually. Performing the individual manual component backups can be tedious, especially to devise a workload to continually achieve efficient backup performance. When restoring data from backup, it can be difficult browse, unify, and/or correlate the separate backups of the components. Attempting to restore only a portion of data in the backups can pose challenges of locating relevant data in the various backup components. It is desirable for a process of backing up content system 200 to be automated, efficient, consistent, and configurable while being transparent to a user of the system.

Figure 3:
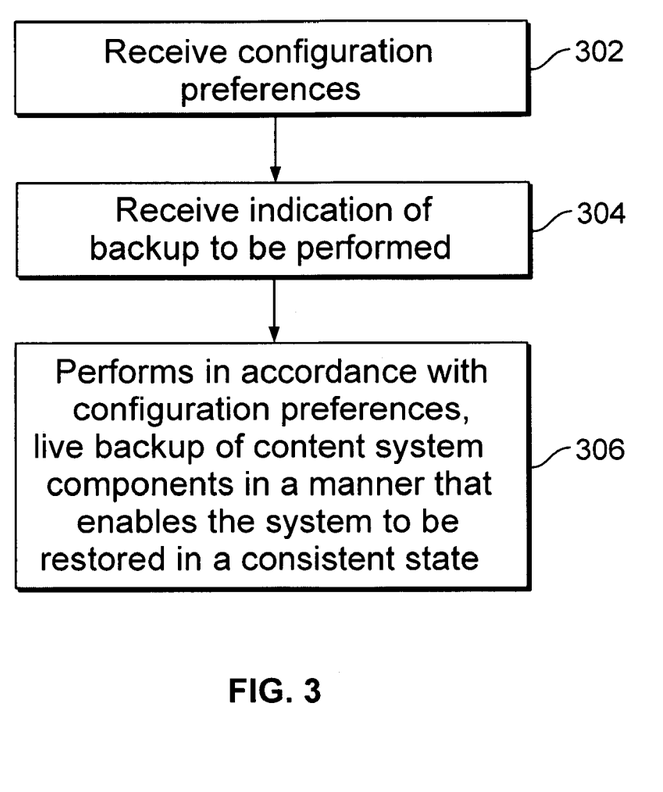
FIG. 3 is a flow chart illustrating an embodiment of a process for performing a backup of a content system.

FIG. 3 is a flow chart illustrating an embodiment of a process for performing a backup of a content system. In some embodiments, the content system includes content system 200 of FIG. 2. At 302, configuration preferences are received. Receiving configuration preferences may include one or more of the following: accessing a configuration file, using a predetermined default configuration for an unspecified configuration, using a system configuration data, and accepting command-line input from a user and/or an administrator for a configuration. Examples of configurations include one or more of the following: source data configuration, destination backup data configuration, system configuration, user access configuration, backup consistency configuration, security configuration, and specification of one or more backup tools/utilities/scripts. At 304, an indication of a backup to be performed is received. In some embodiments, the indication includes a specification of a portion of data to be backed up in a content system. For example, only content data associated with a specific storage area is specified for backup. In some embodiments, the specification of data to be backed up is specified using configuration preferences. In various embodiments, the indication includes a request for initiation of a backup process. The backup may be performed periodically, on a prescribed basis, and/or substantially concurrent with a received indication. At 306, a live backup of content system components is performed in a manner that enables the system to be restored in a consistent state. In some embodiments, the live backup is performed in accordance with the received configuration parameters. In some embodiments, a component backup is performed as a snapshot backup that does not require traversal of a directory structure associated with the component. In some embodiments, a component backup is performed as a direct file copy. In some embodiments, a component backup can be performed using one or more various backup methods. Performing the live backup does not render the content system inaccessible by a user for the entire backup process. In some embodiments, restoring data to a consistent state includes restoring data to the system in a state recoverable by the system. For example, a content system is restored to a consistent state even if the system contains an inconsistency when the inconsistency is known by the system, the inconsistency is tolerated by the system, the inconsistency is recoverable by the system, and/or the inconsistency will not cause an error in the system. The inconsistency, in some embodiments, is tolerated if the inconsistency was generated within a specified amount of time in between component backups during a backup session.

Figure 4:
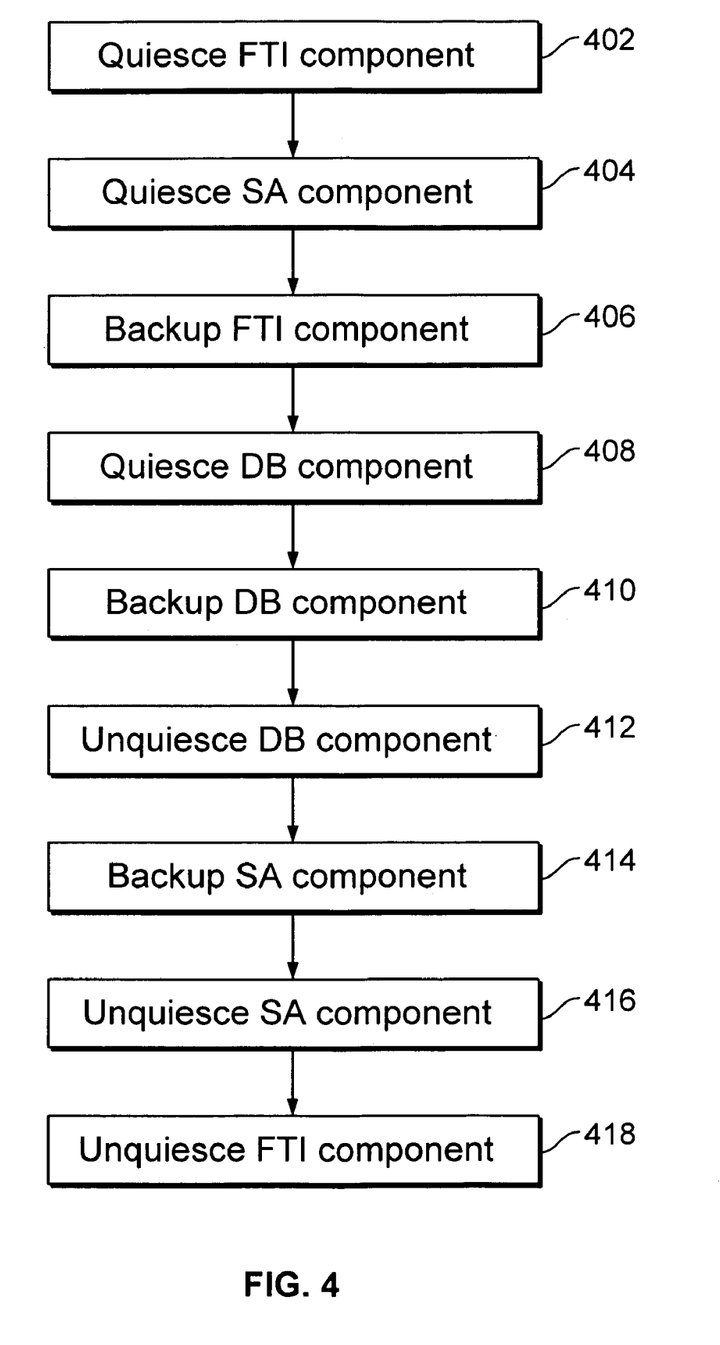
FIG. 4 is a block diagram illustrating an embodiment of a process for performing a backup of content system components.

FIG. 4 is a block diagram illustrating an embodiment of a process for performing a backup of content system components. In some embodiments, the process of FIG. 4 is included in 306 of FIG. 3. At 402, FTI component is quiesced. In some embodiments, the FTI component is FTI 204 of FIG. 2. Quiescing a component includes preparing the component for creating a consistent backup state. For example, updates are not allowed to the component but reads are allowed. In some embodiments, quiescing is associated with performing one or more operations to ensure intra-component consistency. In some embodiments quiescing a storage component includes performing one or more following: flushing one or more buffers associated with the storage component, disabling updates to the component, and logging transactions associated with the component. In various embodiments, the type of operations associated with performing quiescing is configurable. For example, configuration parameters in 302 of FIG. 3 may specify the type of operations and/or configuration associated with the operations performed during quiescing. At 404, SA component is quiesced. In some embodiments, the SA component is SA 208 of FIG. 2. At 406, the FTI component is backed up. In various embodiments, the type of backup method used to back up the FTI component is configurable and/or specified by configuration preference in 302 of FIG. 3. At 408, DB component is quiesced. In some embodiments, the DB component is DB 206 of FIG. 2. At

410, DB component is backed up. In various embodiments, the type of backup method used to back up the DB component is configurable and/or specified by configuration preference in 302 of FIG. 3. In some embodiments, a database backup tool/utility/script is used to perform the DB backup. The database backup utility may be a third party backup database utility. At 412, DB component is unquiesced. In some embodiments, unquiescing a component includes performing one or more of the following: re-enabling updates, ending hot backup transaction logging, and implementing changes requested to the component while quiesced. At 414, the SA component is backed up. In various embodiments, the type of backup method used to back up the SA component is configurable and/or specified by configuration preference in 302 of FIG. 3. In some embodiments, the SA component backup is initiated within a prescribed or indicated amount of time from unquiescing the DB component. The time constraint may guarantee a tolerable level of consistency in the created backup of the components. At 416, the SA component is unquiesced. At 418, the FTI component is unquiesced.

Figure 5:
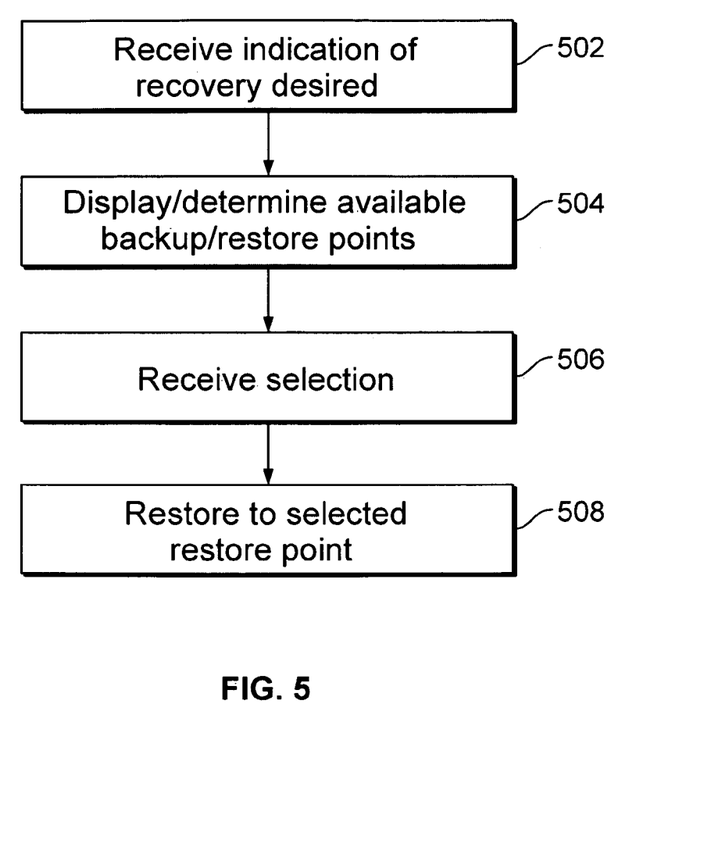
FIG. 5 is a block diagram illustrating an embodiment of a process for restoring data.

In some embodiments, at least a portion of the order of the process of FIG. 4 is important in ensuring the backup is created in a consistent state. For example, in a consistent backup, the SA component backup may contain data not referenced by the DB component backup, but the DB component backup may not reference data not contained in the SA component backup. To ensure such a consistency, the DB component must be backed up before the SA component. In some embodiments, the DB backup is initiated after the FTI backup. In such a case, data associated with the FTI backup will only reference data referenced by metadata in the DB backup. The order of the backup process, in some embodiments, is dependent upon one or more characteristics of a storage component and/or a content system. In various embodiments, amount of time between and/or taken during the process portions of FIG. 4 is important in ensuring the backup is created in a consistent state. For example, the backup of the SA component must be initiated within the de-facto standard five minutes after the unquiescing of the DB component to ensure the amount of data present in the SA component backup not referenced by the DB component backup is within a tolerated level. The order of process portions shown in FIG. 4 is merely an example. Various ordering that guarantees consistency in the created backup exists. In some embodiments, the FTI is unquiesced after the SA component is backed up FIG. 5 is a block diagram illustrating an embodiment of a process for restoring data. In some embodiments, the data is restored to content system 200 of FIG. 2 using component backups created at least in part using the process of FIG. 4. At 502, an indication of a desired recovery is received. In some embodiments, the indication includes initialization of a backup restore process. At 504, available backup/restore points are displayed and/or determined. In some embodiments, the backup/restore points include one or more groups of related backups. For example, a restore point includes a FTI, a DB, and a SA component backups associated with a singe backup session. In various embodiments, the backup/restore points are organized by backup creation times. At 506, a selection of a backup/restore point to be restored is received. In some embodiments, the selection is automatic. For example, when a user specifies a time of a desired restore point, a backup/restore point is automatically determined. At 508, the selected backup/restore point is restored. In some embodiments, only a portion of data associated with a restore point is selected and restored.

Figure 6:
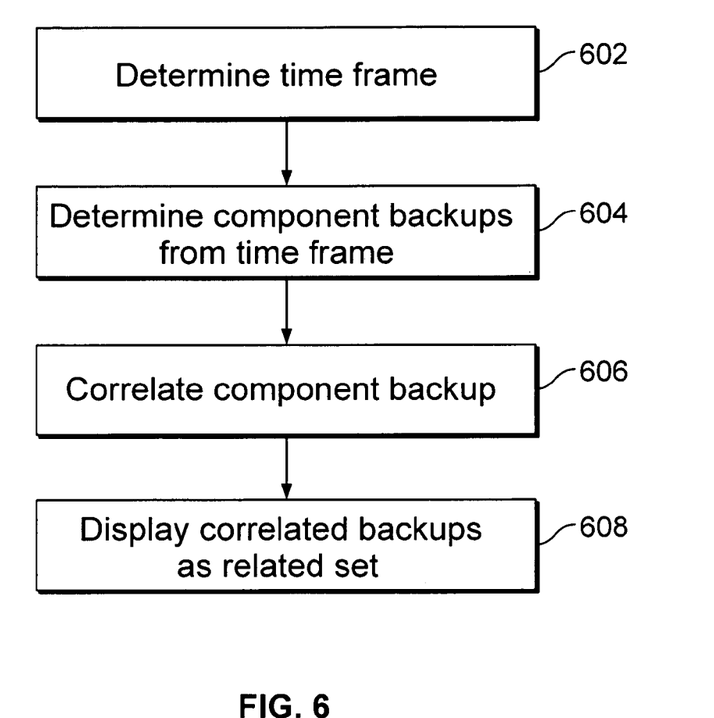
FIG. 6 is a block diagram illustrating an embodiment of a process for displaying correlated backups.

FIG. 6 is a block diagram illustrating an embodiment of a process for displaying correlated backups. In some embodiments, the process of FIG. 6 is included in 504 of FIG. 5. At 602, a time frame is determined. In some embodiments, determining the time frame includes determining a time value and/or a range of time values. In various embodiments, the time frame is user defined and/or predetermined. At 604, component backups from the time frame are determined. In some embodiments, determining the component backups includes locating one or more component backups created in the determined time frame. At 606, the determined component backups are correlated. In some embodiments, correlating the component backups include associating together related backups and/or component backups created in the same backup session. The backup component correlation can be preprocessed and/or performed during backup recovery. For example, while component backups are created (e.g., the process of FIG. 4), the component backups are stored together with metadata correlating the component backups. Examples of the correlation metadata include one or more of the following: a unique point-in-time backup timestamp, a list of related component backup instances, pointers to a backup storage index, and backup/restore parameter settings. This correlation metadata can be used when restoring component backups to determine correlated component backups. At 608, the correlated backups are displayed as a related set. In some embodiments, at least a portion of information associated with the displayed set and/or data contained in a component backup of the displayed set is browseable by a user.

Figure 7:
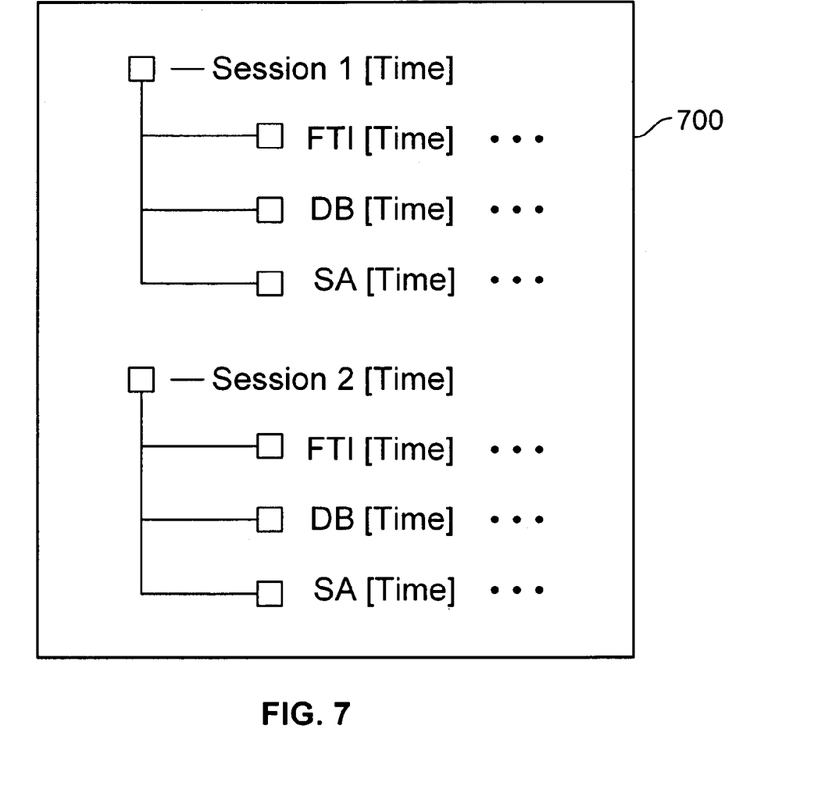
FIG. 7 is a diagram of at least a portion of a display illustrating correlated component backups.

FIG. 7 is a diagram of at least a portion of a display illustrating correlated component backups. In some embodiments, display portion 700 is associated with the display in 504 of FIG. 5 and/or 608 of FIG. 6. In the display example shown, display portion 700 includes two sets of correlated component backups. Component backups are correlated by backup sessions. The backup sessions are associated with a timestamp indicating a backup session creation time. The session listings include a listing of a FTI backup instance, a DB backup instance, and a SA backup instance. Each listing of the component instance may include a display of component backup creation time and/or other data associated with the component backup. In some embodiments, correlated component backups are displayed using a command line prompt. In some embodiments, at least a portion of data contained in a listed component backup can be displayed by selecting the listed component backup.

Figure 8:
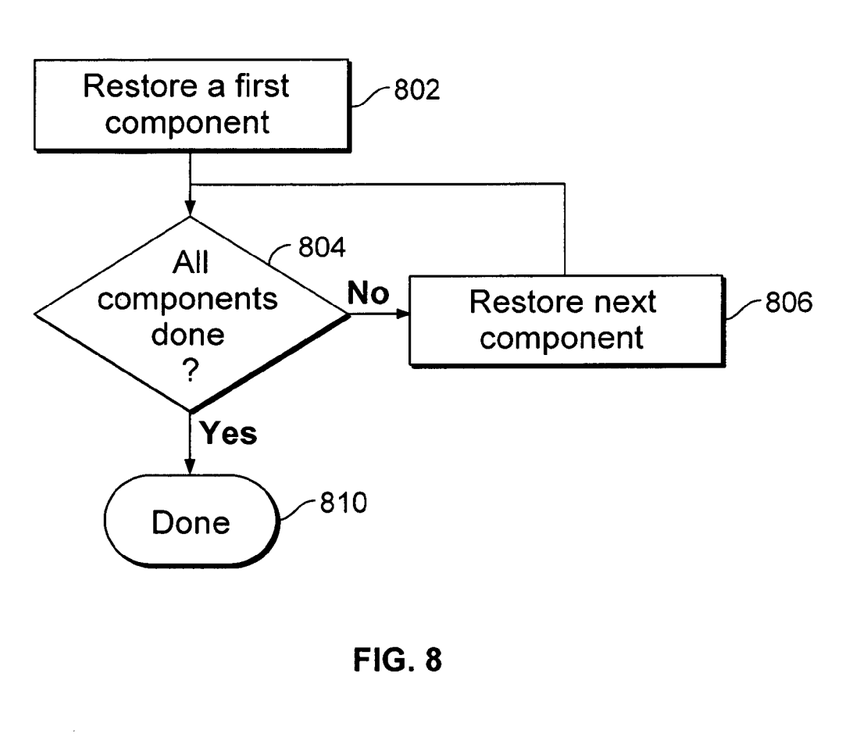
FIG. 8 is a flow chart illustrating an embodiment of a process for restoring a backup.

FIG. 8 is a flow chart illustrating an embodiment of a process for restoring a backup. In some embodiments, the process of FIG. 8 is included in 508 of FIG. 5. At 802, a first component is restored. Restoring a first component includes using a component backup to restore the first component to a specified restore point. At 804, if it is determined that not all components have been restored, at 806, a next component is restored, and the process returns to 804. At 804, if it is determined that all components have been restored, at 810, process ends. The order of the component restoration may be preconfigured, specified by a configuration, or dependent upon characteristics of the components and/or a system associated with the components.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing a backup, comprising:
   using a processor to back up a first set of data associated with a second set of data, wherein the second set of data comprises one or more items of managed content;
   making the first set of data available for use for content management functions before backing up the second set of data, wherein the first set of data comprises metadata used for content management functions to manage said one or more items of managed content; and
   using a processor to back up the second set of data within a prescribed interval after completing the backup of the first set of data and after the first set of data has been made available for use, wherein:
      the prescribed interval is determined at least in part by a maximum permissible amount of inconsistency between the first and second sets of data;
      backing up the first set of data and backing up the second set of data are performed in a manner that enables the first set and the second set to be restored in a recoverable state of consistency; and
      the recoverable state of consistency allows the second set to contain data not associated with the first set but does not allow the first set to inconsistently reference data not contained in the second set.

2. The method as recited in claim 1, wherein backing up the first set is performed at least in part by using a third party database backup utility.

3. The method as recited in claim 1, wherein any inconsistencies in the recoverable state of consistency only includes one or more of the following: a known inconsistency, a tolerated inconsistency, a non-error causing inconsistency, and an inconsistency generated during the prescribed interval.

4. The method as recited in claim 1, wherein when performing the restore, one or more available restore points are determined, and each restore point is associated with a correlated group of at least two sets of backup data.

5. The method as recited in claim 1, wherein the first set of data is made available for use during the backup of the first set of data.

6. The method as recited in claim 1, wherein the first set of data is made available for use once the backup of the first set of data has been completed.

7. The method as recited in claim 1, wherein the metadata is stored in one or more of the following formats: a database format, an index data format, and a log data format.

8. The method as recited in claim 1, further comprising backing up a third set of data associated with the first set, the second set, or both the first and the second set.

9. The method as recited in claim 1, further comprising receiving configuration preferences at least in part used in performing the backup.

10. The method as recited in claim 1, wherein the backup is performed periodically, on a prescribed basis, or substantially concurrent with a received indication.

11. The method as recited in claim 1, further comprising:
   quiescing the first set of data and the second set of data before backing up the first and the second sets of data;
   unquiescing the first set of data when making the first set of data available for use; and
   unquiescing the second set of data after the backup of the second set of data.

12. The method as recited in claim 11, wherein quiescing the first set of data includes performing one or more of the following: preparing the first set of data for creating a consistent backup state, allowing read access to the first set but not allowing updates to the first set, flushing one or more buffers associated with the first set, disabling updates to the first set, and logging data transactions associated with the first set.

13. The method as recited in claim 11, wherein unquiescing the first set of data includes performing one or more of the following: re-enabling updates, ending transaction logging, and implementing changes requested to the first set while quiesced.

14. The method as recited in claim 1, further comprising correlating together the produced backup of the first set and the produced backup of the second set.

15. A system for performing a backup, comprising:
   a processor configured to:
      backup a first set of data associated with a second set of data, wherein the second set of data comprises one or more items of managed content;
      make the first set of data available for use for content management functions before backup of the second set of data, wherein the first set of data comprises metadata used for content management functions to manage said one or more items of managed content; and
      backup the second set of data within a prescribed interval after completing the backup of the first set of data and after the first set of data has been made available for use, wherein:
         the prescribed interval is determined at least in part by a maximum permissible amount of inconsistency between the first and second sets of data;
         backing up the first set of data and backing up the second set of data are performed in a manner that enables the first set and the second set to be restored in a recoverable state of consistency; and
         the recoverable state of consistency allows the second set to contain data not associated with the first set but does not allow the first set to inconsistently reference data not contained in the second set; and
   an interface coupled to the processor for communicating with a backup storage.

16. A computer program product for performing a backup, the computer program product being embodied in a computer readable storage medium and comprising computer instructions for:
   backing up a first set of data associated with a second set of data, wherein the second set of data comprises one or more items of managed content;
   making the first set of data available for use for content management functions before backing up the second set of data, wherein the first set of data comprises metadata used for content management functions to manage said one or more items of managed content; and
   backing up the second set of data within a prescribed interval after completing the backup of the first set of data and after the first set of data has been made available for use, wherein:
      the prescribed interval is determined at least in part by a maximum permissible amount of inconsistency between the first and second sets of data;
      backing up the first set of data and backing up the second set of data are performed in a manner that enables the first set and the second set to be restored in a recoverable state of consistency; and
      the recoverable state of consistency allows the second set to contain data not associated with the first set but does not allow the first set to inconsistently reference data not contained in the second set.

17. The method as recited in claim 1, wherein the first set of data is stored in a database; backing up the first set of data includes quiescing the database; and making the first set of data available for use before backing up the second set of data includes unquiescing the database prior to backing up the one or more items of managed content.

18. The method as recited in claim 17, wherein making available includes allowing updates.

19. The system as recited in claim 15, wherein any inconsistencies in the recoverable state of consistency only includes one or more of the following: a known inconsistency, a tolerated inconsistency, a non-error causing inconsistency, and an inconsistency generated during the prescribed interval.

20. The system as recited in claim 15, wherein the processor is further configured to:

quiesce the first set of data and the second set of data before backing up the first and the second sets of data;

unquiesce the first set of data when making the first set of data available for use; and unquiesce the second set of data after the backup of the second set of data.

21. The computer program product as recited in claim 16, wherein any inconsistencies in the recoverable state of consistency only includes one or more of the following: a known inconsistency, a tolerated inconsistency, a non-error causing inconsistency, and an inconsistency generated during the prescribed interval.

22. The computer program product as recited in claim 16, further comprising computer instructions for:

quiescing the first set of data and the second set of data before backing up the first and the second sets of data;

unquiescing the first set of data when making the first set of data available for use; and unquiescing the second set of data after the backup of the second set of data.

* * * * *